(12) United States Patent
Tinianov et al.

(10) Patent No.: US 10,174,499 B1
(45) Date of Patent: Jan. 8, 2019

(54) ACOUSTICAL SOUND PROOFING MATERIAL FOR ARCHITECTURAL RETROFIT APPLICATIONS AND METHODS FOR MANUFACTURING SAME

(75) Inventors: Brandon D. Tinianov, Santa Clara, CA (US); Pamela L. Preston, San Jose, CA (US)

(73) Assignee: Pacific Coast Building Products, Inc., Rancho Cordova, CA (US)

( * ) Notice: Subject to any disclaimer, the term of this patent is extended or adjusted under 35 U.S.C. 154(b) by 210 days.

(21) Appl. No.: 11/742,973

(22) Filed: May 1, 2007

(51) Int. Cl.
| | |
|---|---|
| B32B 9/00 | (2006.01) |
| E04B 1/82 | (2006.01) |
| E04B 1/86 | (2006.01) |
| E04B 1/84 | (2006.01) |
| C04B 28/14 | (2006.01) |
| G10K 11/16 | (2006.01) |

(52) U.S. Cl.
CPC .................. *E04B 1/82* (2013.01); *E04B 1/84* (2013.01); *E04B 1/8409* (2013.01); *E04B 1/86* (2013.01); *C04B 28/14* (2013.01); *E04B 2001/8461* (2013.01); *E04B 2001/8476* (2013.01); *G10K 11/16* (2013.01); *Y10T 156/10* (2015.01)

(58) Field of Classification Search
None
See application file for complete search history.

(56) References Cited

U.S. PATENT DOCUMENTS

| | | | |
|---|---|---|---|
| 2,811,906 A | 11/1957 | Chappell | |
| 3,160,549 A | 12/1964 | Caldwell et al. | |
| 3,215,225 A | 11/1965 | Kirschner | |
| 3,336,710 A | 8/1967 | Raynes | |

(Continued)

FOREIGN PATENT DOCUMENTS

| | | |
|---|---|---|
| CA | 2219785 | 10/1996 |
| CN | 1358684 A | 7/2002 |

(Continued)

OTHER PUBLICATIONS

Randall F. Barron, Industrial Noise Control an Acoustics, p. 14.*
(Continued)

*Primary Examiner* — David Sample
*Assistant Examiner* — Nicole T Gugliotta
(74) *Attorney, Agent, or Firm* — Sheppard Mullin Richter & Hampton LLP

(57) ABSTRACT

A laminated structure for use in retrofit building construction (partition, wall, ceiling, floor or door) that exhibits improved acoustical sound proofing characteristics while being optimized for efficient installation. The laminated structure includes a panel with at least one layer of viscoelastic glue, or fire-resistant, viscoelastic glue, which functions both as a glue and an energy dissipating layer. In one embodiment, the laminated structure to be attached to an existing wall in some embodiments includes standard paper-faced gypsum board. In another embodiment the to-be-applied laminated structure includes a cement-based board, and in yet another embodiment the to-be-applied laminated structure includes a (Continued)

cellulose-based board. Once the laminated structure is installed on an existing wall or other partition, the resulting structure greatly attenuates transmitted noise and minimizes the labor required for installation and finishing.

35 Claims, 15 Drawing Sheets

(56) References Cited

U.S. PATENT DOCUMENTS

| | | | |
|---|---|---|---|
| 3,399,104 A | | 8/1968 | Ball, III et al. |
| 3,424,270 A | | 1/1969 | Hartman et al. |
| 3,462,899 A | | 8/1969 | Sherman |
| 3,579,941 A | | 5/1971 | Tibbals |
| 3,642,511 A | | 2/1972 | Cohn et al. |
| 3,828,504 A | | 8/1974 | Egerborg et al. |
| 3,876,034 A | * | 4/1975 | Antonini ............ 181/208 |
| 4,003,752 A | | 1/1977 | Osohata et al. |
| 4,112,176 A | | 9/1978 | Bailey |
| 4,156,615 A | | 5/1979 | Cukier et al. |
| 4,347,912 A | | 9/1982 | Flocke et al. |
| 4,375,516 A | | 3/1983 | Barrall |
| 4,474,840 A | | 10/1984 | Adams |
| 4,487,793 A | | 12/1984 | Haines et al. |
| 4,488,619 A | * | 12/1984 | O'Neill ............ 181/290 |
| 4,618,370 A | | 10/1986 | Green et al. |
| 4,642,951 A | | 2/1987 | Mortimer |
| 4,663,224 A | * | 5/1987 | Tabata et al. ............ 442/181 |
| 4,678,515 A | | 7/1987 | Green et al. |
| 4,685,259 A | | 8/1987 | Eberhart et al. |
| 4,743,488 A | * | 5/1988 | Jones et al. ............ 428/198 |
| 4,759,164 A | | 7/1988 | Abendroth et al. |
| 4,778,028 A | | 10/1988 | Staley |
| 4,786,543 A | | 11/1988 | Ferm |
| 4,924,969 A | | 5/1990 | K'Heureux |
| 4,956,321 A | | 9/1990 | Barrall |
| 4,967,530 A | | 10/1990 | Clunn |
| 5,016,413 A | | 5/1991 | Counihan |
| 5,026,593 A | | 6/1991 | O'Brien |
| 5,033,247 A | | 7/1991 | Clunn |
| 5,063,098 A | | 11/1991 | Niwa et al. |
| 5,110,660 A | | 5/1992 | Wolf et al. |
| 5,125,475 A | | 6/1992 | Duchame et al. |
| 5,158,612 A | | 10/1992 | Savoly et al. |
| 5,240,639 A | | 8/1993 | Diez et al. |
| 5,256,223 A | | 10/1993 | Alberts et al. |
| 5,258,585 A | | 11/1993 | Juriga |
| 5,334,806 A | | 8/1994 | Avery |
| 5,342,465 A | | 8/1994 | Bronowicki et al. |
| 5,368,914 A | | 11/1994 | Barrett |
| 5,439,735 A | | 8/1995 | Jamison |
| 5,473,122 A | | 12/1995 | Kodiyalam et al. |
| 5,502,931 A | * | 4/1996 | Munir ............ 52/144 |
| 5,603,192 A | | 2/1997 | Dickson |
| 5,629,503 A | | 5/1997 | Thomasen |
| 5,643,666 A | | 7/1997 | Eckart et al. |
| 5,664,397 A | | 9/1997 | Holz |
| 5,691,037 A | | 11/1997 | McCutcheon et al. |
| 5,695,867 A | | 12/1997 | Saitoh et al. |
| 5,768,841 A | | 6/1998 | Swartz et al. |
| 5,824,973 A | | 10/1998 | Haines et al. |
| 5,867,957 A | | 2/1999 | Holtrop |
| 5,910,082 A | | 6/1999 | Bender et al. |
| 5,945,208 A | | 8/1999 | Richards et al. |
| 5,954,497 A | | 9/1999 | Cloud et al. |
| 6,077,613 A | | 6/2000 | Gaffigan |
| 6,123,171 A | | 9/2000 | McNett et al. |
| 6,213,252 B1 | | 4/2001 | Ducharme |
| 6,240,704 B1 | | 6/2001 | Porter |
| 6,266,427 B1 | | 7/2001 | Mathur |
| 6,286,280 B1 | | 9/2001 | Fahmy et al. |
| 6,290,021 B1 | | 9/2001 | Standgaard |
| 6,309,985 B1 | | 10/2001 | Virnelson et al. |
| 6,342,284 B1 | | 1/2002 | Yu |
| 6,381,196 B1 | | 4/2002 | Hein et al. |
| 6,389,771 B1 | | 5/2002 | Moller |
| 6,443,256 B1 | | 9/2002 | Baig |
| 6,586,066 B1 | * | 7/2003 | Buckwalter et al. ........ 428/40.1 |
| 6,632,550 B1 | | 10/2003 | Yu |
| 6,676,744 B2 | | 1/2004 | Merkley et al. |
| 6,699,426 B1 | | 3/2004 | Burke |
| 6,715,241 B2 | | 4/2004 | Gelin et al. |
| 6,758,305 B2 | | 7/2004 | Gelin et al. |
| 6,790,520 B1 | * | 9/2004 | Todd et al. ............ 428/318.4 |
| 6,800,161 B2 | | 10/2004 | Takigawa |
| 6,803,110 B2 | | 10/2004 | Drees et al. |
| 6,815,049 B2 | | 11/2004 | Veramasuneni |
| 6,822,033 B2 | | 11/2004 | Yu |
| 6,825,137 B2 | | 11/2004 | Fu et al. |
| 6,877,585 B2 | | 4/2005 | Tinianov |
| 6,913,667 B2 | * | 7/2005 | Nudo et al. ............ 156/254 |
| 6,920,723 B2 | | 7/2005 | Downey |
| 6,941,720 B2 | | 9/2005 | Deford et al. |
| 7,041,377 B2 | | 5/2006 | Miura et al. |
| 7,068,033 B2 | | 6/2006 | Sellers et al. |
| 7,181,891 B2 | | 2/2007 | Surace et al. |
| 7,197,855 B2 | | 4/2007 | Della Pepa |
| 2004/0016184 A1 | | 1/2004 | Huebsch et al. |
| 2004/0127614 A1 | * | 7/2004 | Jiang et al. ............ 524/270 |
| 2004/0168853 A1 | | 9/2004 | Gunasekera et al. |
| 2004/0214008 A1 | | 10/2004 | Dobrusky et al. |
| 2005/0050846 A1 | * | 3/2005 | Surace et al. ............ 52/782.1 |
| 2005/0103568 A1 | | 5/2005 | Sapoval et al. |
| 2006/0048682 A1 | | 3/2006 | Wagh et al. |
| 2006/0057345 A1 | | 3/2006 | Surace et al. |
| 2006/0059806 A1 | | 3/2006 | Gosling et al. |
| 2006/0108175 A1 | | 5/2006 | Surace et al. |
| 2007/0094950 A1 | | 5/2007 | Surace et al. |
| 2007/0107350 A1 | | 5/2007 | Surace et al. |
| 2007/0137139 A1 | * | 6/2007 | Tierney et al. ............ 52/748.1 |
| 2007/0175173 A1 | | 8/2007 | Babineau, Jr. et al. |
| 2008/0251198 A1 | * | 10/2008 | Tinianov ............ 156/291 |
| 2008/0264721 A1 | * | 10/2008 | Tinianov et al. ............ 181/290 |

FOREIGN PATENT DOCUMENTS

| | | |
|---|---|---|
| EP | 1154087 B1 | 11/2001 |
| JP | 09-203153 | 8/1997 |
| JP | 2002-164690 | 6/2002 |
| WO | WO 96/34261 | 10/1996 |
| WO | WO 97/19033 | 5/1997 |
| WO | WO 00/24690 | 5/2000 |

OTHER PUBLICATIONS

QuietGlue® Website (Feb. 5, 2007): http://web.archive.org/web/20070205165912/http://www.quietsolution.com/html/quietglue.html.*

Noise and Vibration Control Engineering: *Principles and Applications*, Edited by Leo Beranek and Instvan Ver, Chapter 11, John Wiley & Sons, Inc., 1002, (12 pages).

Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).

"Green Glue is your soundproofing solution and noise reduction material", www.greengluecompany.com. (2 pages).

Acoustical: *A Sound Approach to Testing*, www.archest.com/pages (2 pages).

STC—*Sound Transmission Class—Discussion and Use*, www.sota.ca/stc_info.htm (3 pages).

ASTM International, Designation: C 1396/C 1396M-04, *Standard Specification for Gypsum Board* (7 pages).

Barbara C. Lippiatt, National Institute of Standards and Technology. BEES 3.0, "*Building for Environmental and Economic Sustainability* Technical Manual and User Guide", Oct. 2002, (198 pages).

Takada, et al., *Effect in Reducing Floor Impact Noise Of Recycled Paper Damper Members*, Bulletin of Tokyo Metropolitan Industrial Technology Research Institute, No. 2 (1999) [certified English translation] (13 pages).

(56) References Cited

OTHER PUBLICATIONS

*Architectural Acoustics*, M. David Egan, J. Ross Publishing (Reprint 2007) p. 211; originally published McGraw-Hill, 1988 (5 pages).
Hastings, Mardi C.; Godfrey, Richard; Babcock, G. Madison, *Application of Small Panel Damping Measurements to Larger Walls*, Proc. SPIE vol. 2720, p. 70-76, Smart Structures and Materials 1996: Passive Damping and Isolation (7 pages).
Van Vuure, A.W.; Verpoest, I., Ko, F.K., *Sandwich-Fabric Panels As Spacers in a Constrained Layer Structural Damping Application*, Composites Part B 32 (2001) 11-19, Elsevier Science Ltd. (9 pages).
Noise and Vibration Control, Revised Edition, pp. 306-315, Institute of Noise Control Engineering, 1988, Beranek, Leo L. (editor) (9 pages).
Noise and Vibration Control, Chapter Fourteen, *Damping of Panels*, Ungar, Eric E., pp. 434-473, McGraw-Hill, 1971, Beranek, Leo L. (editor) (7 pages).
Noise and Vibration Control Engineering, *Principles and Application*, pp. 466-479, John Wiley & Sons, 1992, Beranek, Leo L. and Ver, Istvan L. (editors) (9 pages).
Nashif, Ahid D.; Jones, David I. G.; Henderson, John P., *Vibration Damping*, pp. 290-305, John Wiley & Sons, 1985 (18 pages).
Architectural Acoustics, Principles and Practice, John Wiley & sons, 1992, Cavanaugh, William J. and Wilkes, Joseph A. (editors) (332 pages).
FIRE Resistance Design Manual, Sound Control, Gypsum Association, GA-600-94 ($14^{th}$ Ed.) (107 pages).
FIRE Resistance Design Manual, Sound Control, Gypsum Association, GA-600-97 ($15^{th}$ Ed.) (120 pages).
FIRE Resistance Design Manual, Sound Control, Gypsum Association, GA-600-2000 ($16^{th}$ Ed.) (139 pages).
Noxon, Arthur M., *The Chain is as Strong as Its Weakest Link*, An article written for the first Hong Kong HiFi Show, 1993, Translated and Published in Chinese, http://www.acousticsciences.com/articles/chain.htm (7 pages).
*Quiet Lightweight Floor Systems*, Reprint from Sound and Vibration Magazine, Jul. 1992, by David A. Harris, Building & Acoustic Design Consultants (7 pages).
Joyal, Brian, *Constrained-Layer Systems Provide Weight-Efficient, High Level Damping* (4 pages).
Dynamat materials http://web.archive.org/web/20010525113753/www.admteschusa.com/Dynamat.html Jun. 12, 2007, ADM Tech—Dynamic Control (15 pages).
Noise Killer: Pro Damping Compound Materials http://www.tnt-audio.com/clinica/noise.html May 18, 2007, 1998 (3 pages).
Waybackmachine search results for Jan. 1, 1996-Jun. 12, 2007 (1 page).
Frankovich, David, *The Four-Fold Method of Noise and Vibration Control* (8 pages).
Renninger, Jennifer, *Understanding Damping Techniques for Noise and Vibration Control* (8 pages).
Unified Facilities Criteria (UFC) *Noise and Vibration Control*, UFC 3-450-01. May 15, 200, Department of Defense (156 pages).
United States Gypsum, *Architectural and Construction Services, Design Data for Acousticians*, Feb. 1986 (4 pages).
*A Study of Techniques to Increase the Sound of Insulation of Building Elements*, Wyle Laboratories, Prepared for Dept. of Housing and Urban Development, Jun. 1973 (12 pages).
DB-Ply materials Sound Reducing Panels from Greenwood Forest Products, Inc., Apr. 24, 1997 (9 pages).
DB-Rock materials OMNI Products, Inc. (3 pages).

ASC WallDamp materials from Acoustic Sciences Corporation http://web.archive.org/web/20021013031149/www.asc-soundproof.com/index-walldamp . . . May 18, 2007 (21 pages).
Sounddown Viscoelastic Glue DG-A2, Soundown Corporation (2 pages).
Nordisk Akustik A/S materials, http://web.archive.org/web/200206240933724/www.nordisk-akustik.dk/html_uk/prod03.ht . . . Jun. 11, 2007 (4 pages).
IES 2000 *Dampening And Visocelastic Membranes* (Jul. 2, 2003) Atlanta.com/product (pp. 1-6).
Waybackmachine search results for Jan. 1, 1996-May 3, 2006 (1 page).
"*Damping of plate flexural vibrations by means of viscoelastic laminae*" by D. Ross, E.E. Ungar, and E.M. Kerwin—Structural Damping, Section III, ASME, 1959, New York (41 pages).
Vandersall, H. L., "*Intumescent Coating Systems, Their development and Chemistry*" J. Fire & Flammability, vol. 2 (Apr. 1971) pp. 97-140 (45 pages).
English Language Abstract, JP Patent First Publication No. 09-203153, Aug. 5, 1997, (2 pages).
*A Study Of Techniques To Increase The Sound of Insulation of Building Elements*, Wyle Laboratories, Prepared for Dept. of Housing and Urban Development, Jun. 1973 (16 pages).
*Field Sound Insulation Evaluation of Load-Beating Sandwich Panels For Housing*, Final Report, Prepared by Robert E. Jones, Forest Products Laboratory, Forest Service, U.S. Department of Agriculture, Aug. 1975 (53 pages).
*Sound Studio Construction On A Budget*, F. Alton Evererst, McGraw-Hill, 1997 (7 pages).
*Wood Handbook/Wood as an Engineering Material*, United States Department of Agriculture, Forest Service, General Technical Report FPL-GTR-113, Mar. 1999 (24 pages).
*Transmission Loss of Plasterboard Walls* by T. D. Northwood, Building Research Note, Division of Building Research, National Research Counsel, Ottawa, Canada (10 pages).
*A Guide to Airborne, Impact, and Structureborne Noise Control in Multifamily Dwellings*, U. S. Department of Housing and Urban Development, Prepared for the National Bureau of Standards, Washington, D. C., Jan. 1963 (5 pages).
*Transmission Loss of Leaded Building Materials*, Paul B. Ostergaard, Richmond L. Cardinell, and Lewis S. Goodfriend, The Journal of the Acoustical Society of America, vol. 35, No. 6, Jun. 1963 (7 pages).
*Dictionary Of Architecture & Construction 2200 illustrations*, Third Edition, Edited by Cyril M. Harris, Professor Emeritus of Architecture Columbia University, McGraw-Hill, 2000 (7 pages).
*Dictionary Of Engineering Materials*, Harald Keller, Uwe Erb, Wiley-Interscience by John Wiley & Sons, Inc. 2004 (4 pages).
*Chamber Science and Technology Dictionary*, by Professor Peter M. B. Walker, W & R Chambers Ltd and Cambridge University Press, 1988 (3 pages).
Creton, Costantino, "Pressure-Sensitive Adhesives: An Introductory Course", *MRS Bulletin*, Jun. 2003, pp. 434-439. www.mrs.org/publications/bulletin.
Darrouj, M.N., "Optimum Design of Constrained Layer Damping Panels," *Materials & Design*, vol. 10, No. 4, Jul./Aug. 1989, pp. 202-208.
D.I.G. Jones, "Handbook of Viscoelastic Vibration Damping," *John Wiley and Sons*, Aug. 2001, pp. 284-297.
Pritz, T., "*Loss Factor Peak of Viscoelastic Materials: Magnitude to Width Relations,*" Journal of Sound and Vibration, 2001, pp. 265-280.

* cited by examiner

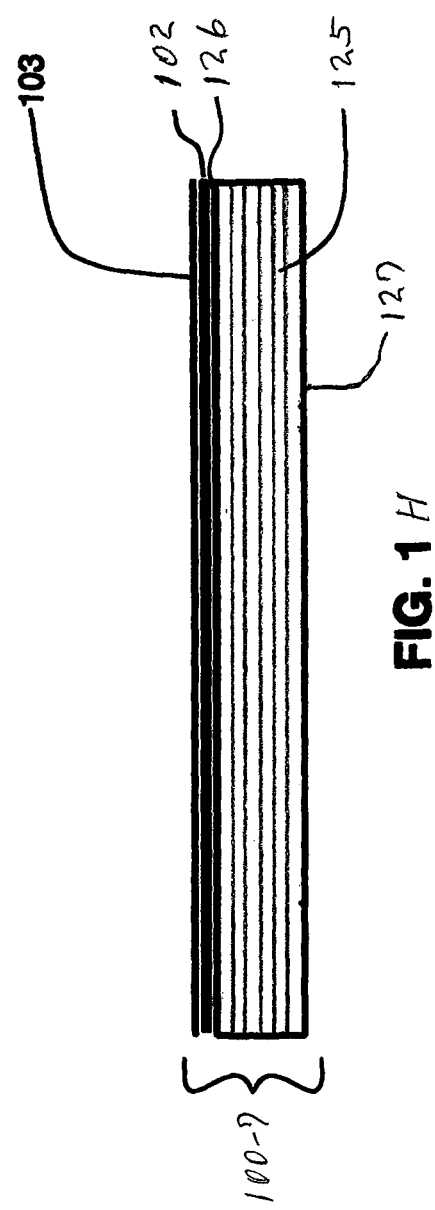

ACOUSTICAL SOUND PROOFING MATERIAL FOR ARCHITECTURAL RETROFIT APPLICATIONS AND METHODS FOR MANUFACTURING SAME

BACKGROUND

Noise control constitutes a rapidly growing economic and public policy concern for the construction industry. Areas with high acoustical isolation (commonly referred to as 'soundproofed') are requested and required for a variety of purposes. Apartments, condominiums, hotels, schools and hospitals all require walls, ceilings and floors that are specifically designed to reduce the transmission of sound in order to minimize or eliminate the disruption to people in adjacent rooms. Soundproofing is particularly important in buildings adjacent to public transportation including highways, airports and railroad lines. Additionally, theaters and home theaters, music practice rooms, recording studios and others require increased noise abatement for acceptable listening levels. Likewise, hospitals and general healthcare facilities have begun to recognize acoustical comfort as an important part of a patient's recovery time. One measure of the severity of multi-party residential and commercial noise control issues is the widespread emergence of model building codes and design guidelines that specify minimum Sound Transmission Class (STC) ratings for specific wall structures within a building. Another measure is the broad emergence of litigation between homeowners and builders over the issue of unacceptable noise levels. To the detriment of the U.S. economy, both problems have resulted in major builders refusing to build homes, condominiums and apartments in certain municipalities; and in cancellation of liability insurance for builders.

When a problem arises and the project success is at risk, the building owner must remediate the existing constructed building partitions. Various construction techniques and products have emerged to address the problem of noise control, but few are well suited to a situation of post-construction remediation. Choices include: additional gypsum drywall layers; the addition of resilient channels plus additional isolated drywall panels; and the addition of mass-loaded vinyl barriers plus additional drywall panels; cellulose-based sound board. All of these changes incrementally help reduce the noise transmission, but not to such an extent that identified problems areas would be considered fully mitigated (restoring privacy or comfort). The noise may come from rooms above or below the occupied space, or from an outdoor noise source. In fact, several of the above named methods only offer a two to eight decibel improvement in acoustical performance over that of standard construction techniques that have no regard for acoustical isolation. Such a small improvement represents a just noticeable difference, not a soundproofing solution. A popular example solution is that of an additional layer of gypsum wallboard added to an existing wall assembly. This addition only improves the wall's acoustical performance by two to three decibels overall. Such a difference would not be perceptible under normal living conditions. To be truly effective (yielding an improvement in acoustical performance of ten decibels or more), one side of the wall is typically demolished and reconstructed with additional soundproofing measures and materials. This traditional approach involves the burden of additional, costly construction materials, or extra labor expense due to complicated designs and additional assembly steps, and oftentimes, both expensive materials and labor.

More recently, an alternative building noise control product having laminated structures and utilizing a viscoelastic glue has been introduced to the market. The foregoing structures are disclosed and claimed in U.S. Pat. No. 7,181,891 issued Feb. 27, 2007 to the assignee of the present application. The contents of this patent are incorporated by reference herein in its entirety. Laminated structures disclosed and claimed in the '891 Patent include gypsum board layers and these laminated panels eliminate the need for additional materials such as resilient channels, mass loaded vinyl barriers, and additional layers of drywall during initial construction. The resulting system offers excellent acoustical performance improvements of up to 15 decibels in some cases. However, these structures are better suited for new construction than for the acoustical remediation of existing walls or other building partitions. A first shortcoming of this solution is the cost of the premanufactured panel. Such panels consist of five to 11 layers of materials carefully laminated in prescribed manufacturing method. As a result, the panels typically cost significantly more than traditional drywall panels of the same general dimensions. Further, such panels cannot be cut using the traditional tools used in the drywall installation trades. Rather than using a box cutter or utility knife to score the panel for fracture by hand, the panels must be scored multiple times and broken with great force over the edge of a table or workbench. Often times, the quality of the resulting break (in terms of accuracy of placement and overall straightness) is poor. In practice, skilled trades typically resort to the use of power tools such as saws and rotary cutters. This adds to the dust generation, the time required to install the panels, and the time required for site cleanup.

An alternative to the premanufactured panels mentioned above is that of the field application of a viscoelastic glue to regular drywall panels. In this method of noise control, the tradesperson or building owner purchases standard gypsum drywall and a quantity of viscoelastic glue, packaged in buckets or caulking tubes. The tradesperson then distributes the glue via a caulk gun or trowels it across the surface of an unmounted sheet of drywall. After the glue is allowed to dry, the installer tilts the coated drywall sheet onto an existing wall assembly. Viscoelastic glues of the type described here are available from Serious Materials of Sunnyvale, Calif. and Green Glue Company of Fargo, N. Dak. The foregoing method of self assembly has the opportunity to effectively mitigate noise, but is has many obvious shortcomings. First, for a typical architectural installation, the glue must be spread across many hundreds, if not thousands of square feet of gypsum panels. This requires an expansive and inconvenient lay down area for such an activity. Second, the spreading of so much glue in a controlled manner requires considerable effort and labor expense. It is not typical for the drywall trades to spread glue and manually create such assemblies. Special crews need to be trained in the method and many refuse to take on this additional responsibility. Those who do perform the task may pass on exceptional labor charges for the task to the owner of general contractor. In many cases, the installed cost of the final assembly is greater than that of the premanufactured panels. Another shortcoming of this method is the inconsistent assembly technique. The performance of the assembly is very dependent upon the quality of the glue application (including glue layer thickness and coverage). With individual field application of the critical glue component, one can not guarantee the final performance of a given assembly. Many of these assemblies underperform the glue manufacturers' expectations by five to 20 decibels.

Accordingly, what is needed is a new material and a new method of construction to reduce the transmission of sound from a given room to an adjacent area while simultaneously minimizing the materials required and the cost of installation labor during construction.

SUMMARY

A figure of merit for the sound reducing qualities of a material or method of construction is the material or wall assembly's Sound Transmission Class (STC). The STC rating is a classification which is used in the architectural field to rate partitions, doors and windows for their effectiveness in blocking sound. The rating assigned to a particular partition design as a result of acoustical testing represents a best fit type of approach to a curve that establishes the STC value. The test is conducted in such a way as to make it independent of the test environment and yields a number for the partition only and not its surrounding structure or environment. The measurement methods that determine an STC rating are defined by the American Society of Testing and Materials (ASTM). They are ASTM E 90, "Standard Test Method Laboratory Measurement of Airborne Sound Transmission Loss of Building Partitions and Elements," and ASTM E413 "Classification for Sound Insulation," used to calculate STC ratings from the sound transmission loss data for a given structure. These standards are available on the Internet at http://www.astm.org.

In accordance with the present invention, a new laminated structure and associated manufacturing process are disclosed which significantly improve both the material's installation efficiency and the ability of a wall, ceiling, floor or door to reduce the transmission of sound from one architectural space (e.g. room) to an adjacent architectural space, or from the exterior to the interior of an architectural space (e.g. room), or from the interior to the exterior of an architectural space.

The structures include a lamination of two or more different materials. In accordance with one embodiment, a laminated drywall cladding comprises a composite of one layer of selected thickness gypsum board, and a layer of selected thickness sound dissipating adhesive. The sound dissipating adhesive is applied directly to a surface of the gypsum board on the liner or back paper surface of the gypsum board. In one embodiment, the glue layer is a specially formulated QuietGlue® adhesive, which is a viscoelastic material, of a specific thickness. In another embodiment the glue layer is a layer of intumescent glue called Fire-Enhanced (FE) Quiet Glue® adhesive. Formed on a surface of one gypsum board, the glue layer is about $1/32$ inch thick. In one instance, a 4 foot×8 foot panel constructed using a $1/32$ inch thick layer of glue has a total thickness of approximately $5/8$ inches. A double-sided wall structure constructed using standard $5/8$ inch thick gypsum panels, single wood studs, R13 fiberglass batts in the stud cavity, has a STC rating of approximately 34. With the addition of a layer of the laminated drywall cladding panel screwed to each side provides an STC value of approximately 55. If additional layers of standard gypsum were screwed to a wall rather than the laminated drywall cladding panel, the STC would be approximately an STC 39. The result is a reduction in noise transmitted through the wall structure is approximately 21 decibels when using the laminated drywall cladding panel as compared a 5 decibel improvement to the same structure using common (untreated) gypsum boards of equivalent mass and thickness.

In alternative embodiments of the present invention, cellulose-based boards or cement-based boards can be used instead of gypsum board.

BRIEF DESCRIPTION OF THE DRAWINGS

This invention will be more fully understood in light of the following detailed description.

FIG. 1C shows a fourth embodiment of a laminated structure fabricated in accordance with the present invention.

FIG. 1E shows a sixth embodiment of a laminated structure fabricated in accordance with the present invention.

FIG. 1G shows a eighth embodiment of a laminated structure fabricated in accordance with the present invention.

FIG. 1H shows a ninth embodiment of a laminated structure fabricated in accordance with the present invention.

FIG. 1J shows a tenth embodiment of a laminated structure fabricated in accordance with the present invention.

DESCRIPTION OF SOME EMBODIMENTS

The following detailed description is meant to be exemplary only and not limiting. Other embodiments of this invention, such as the number, type, thickness, dimensions, area, shape, and placement order of both external and internal layer materials, will be obvious to those skilled in the art in view of this description.

The process for creating laminated panels in accordance with the present invention takes into account many factors: exact chemical composition of the glue; glue application process; pressing process; and drying and dehumidification process.

Figure 1:
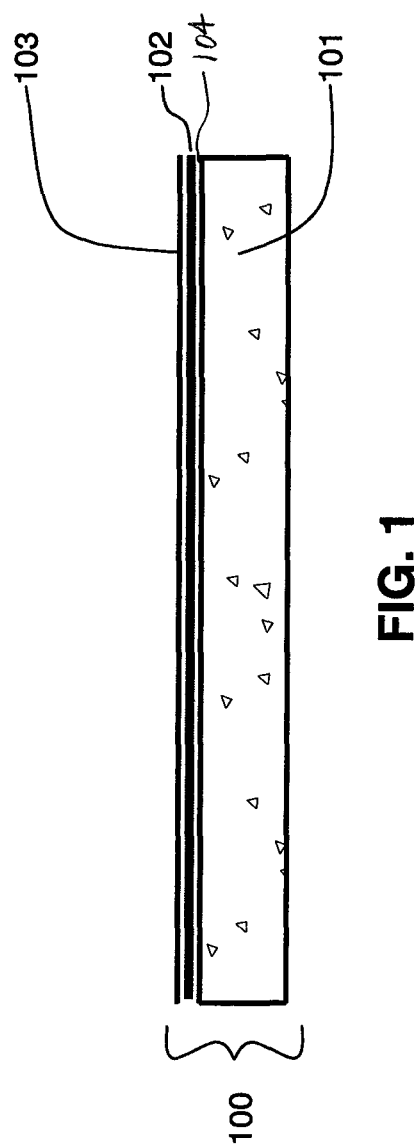
FIG. 1 shows a first embodiment of a laminated structure fabricated in accordance with this invention for reducing the transmission of sound through the material while providing for very low cost installation.

FIG. 1 shows a laminated structure in accordance with one embodiment of this invention. In FIG. 1, the layers in the structure will be described from bottom to top with the structure oriented horizontally as shown. It should be understood, however, that the laminated structure of this invention will be oriented vertically when placed on vertical walls, doors or other vertical partitions, as well as horizontally or even at an angle when placed on ceilings and floors. Therefore, the reference to bottom and top layers is to be understood to refer only to these layers as oriented in FIG. 1 and not in the context of the vertical use of this structure. FIG. 1 shows laminated structure 100 in accordance with an embodiment of the present invention. A bottom layer 101 is gypsum board and in one embodiment is ½ inch thick. Of course, many other combinations and thicknesses can be used for this layer as desired. The thickness is limited only by the acoustical attenuation (i.e., STC rating) desired for the resulting laminated structure and by the weight of the resulting structure which will limit the ability of workers to install the laminated panel on walls, ceilings, floors and doors for its intended use.

The gypsum board suitable for use for bottom layer 101 typically is fabricated using standard well-known techniques and thus the method for fabricating the gypsum board will not be described. Applied to the top surface 104 of layer 101 is a layer of viscoelastic glue 102 called "QuietGlue®" adhesive. Glue 102, made of a viscoelastic polymer, has the property that the kinetic energy in the sound which interacts with the glue, when constrained by surrounding layers, will be significantly dissipated by the glue thereby reducing the sound's total energy across a broad frequency spectrum, and thus the sound energy which will transmit through the resulting laminar structure. Typically, viscoelastic glue 102 is made of the materials as set forth in TABLE 1, although other glues having similar characteristics to those set forth directly below TABLE 1 can also be used in this invention. Alternatively, a fire-resistant, viscoelastic glue described below may be used. Laminated structures 100-2 and 100-3, shown in FIGS. 1B and 1C respectfully, and described below, utilize Fire-Enhanced (FE) QuietGlue® adhesive available from Serious Materials, 1250 Elko Drive, Sunnyvale, Calif. 94089. Table 2 below discloses the composition of Fire-Enhanced (FE) QuietGlue® adhesive.

TABLE 1

QuietGlue ® Adhesive Chemical Makeup

| COMPONENTS | WEIGHT % | | |
| --- | --- | --- | --- |
| | Min | Max | Preferred |
| acrylate polymer | 33.0% | 70.0% | 60.0% |
| ethyl acrylate, methacrylic acid, polymer with ethyl-2-propenoate | 0.05% | 3.00% | 0.37% |
| hydrophobic silica | 0.00% | 0.50% | 0.21% |
| paraffin oil | 0.10% | 5.00% | 1.95% |
| silicon dioxide | 0.00% | 0.50% | 0.13% |
| sodium carbonate | 0.01% | 1.50% | 0.66% |
| stearic acid, aluminum salt | 0.00% | 0.50% | 0.13% |
| surfactant | 0.00% | 1.50% | 0.55% |
| rosin ester | 1.00% | 9.00% | 4.96% |
| water | 25.0% | 40.0% | 30.9% |
| 2-Pyridinethiol, 1-oxide, sodium salt | 0.00% | 0.50% | 0.17% |

The preferred formulation is but one example of a viscoelastic glue. Other formulations may be used to achieve similar results and the range given is an example of successful formulations investigated here.

The physical solid-state characteristics of QuietGlue® adhesive include:
1) a broad glass transition temperature below room temperature;
2) mechanical response typical of a rubber (i.e., elongation at break, low elastic modulus);
3) strong peel strength at room temperature;
4) weak shear strength at room temperature;
6) does not dissolve in water (swells poorly); and
7) peels off the substrate easily at temperature of dry ice.

QuietGlue® adhesive may be obtained from Serious Materials, 1250 Elko Drive, Sunnyvale, Calif., 94089.

As noted above, glue layer 102 may be a patterned layer of intumescent glue called "Fire-Enhanced (FE) Quiet-Glue® adhesive. This fire enhanced glue is made of a viscoelastic polymer doped with fire retardants, has the property of sound dissipation. In other words, when energy in the sound interacts with the glue when constrained by surrounding layers, it will be significantly dissipated thereby reducing the sound's amplitude across a broad frequency spectrum. As a result, the energy of sound which will transmit through the resulting laminated structure is significantly reduced. Typically, this glue 102 is made of the materials as set forth in TABLE 2, although other glues having similar characteristics to those set forth directly below Table 2 can also be used in this invention.

An important component of the fire enhanced glue composition and the overall laminated structure is the addition of intumescent compounds. Intumescent compositions are materials which, when heated above their critical temperature, will bubble and swell, thereby forming a thick non-flammable multi-cellular insulative barrier, up to 200 or more times their original thickness. When applied as intumescent coatings they can provide the protective, serviceable and aesthetic properties of non fire-retardant coatings or layers without occupying any additional initial volume. Intumescent coatings are discussed in detail in Intumescent Coating Systems, Their Development and Chemistry, H. L. Vandersall, J. Fire & Flammability, Vol. 2 (April 1971) pages 97-140, the content of which article is herein incorporated by reference.

Although the majority of commercially available intumescent coatings provide a substantially carbonaceous foam, it is within the scope of this invention to employ inorganic foaming mixtures, (e.g. phosphate/borate) mixtures, expandable graphite intercalation compounds, or a combination of both. The intumescent materials which may be employed in the practice of this invention should swell to at least about two times their original thickness when heated above their critical temperature.

Expandable graphite intercalation compounds are also known as expanding graphite and are commercially available. They are compounds, which contain foreign components intercalated between the lattice layers of the graphite. Such expandable graphite intercalation compounds usually are prepared by dispersing graphite particles in a solution, which contains an oxidizing agent and a guest compound, which is to be intercalated. Usually, nitric acid, potassium chlorate, chromic acid, potassium permanganate and the like are used as oxidizing agent.

TABLE 2

Fire-Enhanced (FE) Quiet Glue ® Adhesive Chemical Makeup

| COMPONENTS | WEIGHT % | | |
|---|---|---|---|
| | Min | Max | Preferred |
| acrylate polymer | 30 | 70 | 41 |
| ethyl acrylate, methacrylic acid, polymer with ethyl-2-propenoate | 0 | 3.0 | 0.3 |
| hydrophobic silica | 0 | 1.0 | 0.2 |
| paraffin oil | 0 | 3.0 | 1.5 |
| silicon dioxide | 0 | 1.0 | 0.1 |
| sodium carbonate | 0 | 3.0 | 0.6 |
| stearic acid, aluminum salt | 0 | 1.0 | 0.1 |
| surfactant | 0 | 2.0 | 0.6 |
| rosin ester | 0 | 20 | 7 |
| Zinc Borate | 0 | 25 | 12 |
| Melamine Phosphate | 0 | 10 | 6 |
| Ammonium Polyphosphate | 0 | 10 | 6 |
| Hexahydroxy methyl ethane | 0 | 5.0 | 1.5 |
| Cl Pigment Red Dispersion | 0 | 1.0 | 0.02 |
| water | 10 | 40 | 23 |
| 2-Pyridinethiol, 1-oxide, sodium salt | 0 | 3.0 | 1 |

The preferred formulation is but one example of a fire-resistant viscoelastic glue. Other formulations may be used to achieve similar results and the range given is an example of successful formulations investigated here.

The physical solid-state characteristics of FE QuietGlue® adhesive include:
1) a broad glass transition temperature below room temperature;
2) mechanical response typical of a rubber (i.e., elongation at break, low elastic modulus);
3) strong peel strength at room temperature;
4) weak shear strength at room temperature;
6) does not dissolve in water (swells poorly);
7) peels off the substrate easily at temperature of dry ice; and
8) forms an expanding char layer when exposed to flame.
FE QuietGlue® adhesive may be obtained from Serious Materials, 1250 Elko Drive, Sunnyvale, Calif., 94089.

Optionally a layer of film 103 is placed on the top of the structure and carefully pressed in a controlled manner with respect to uniform pressure (pounds per square inch), temperature and time. Film 103 may be made of materials such as silicone-coated paper or film, polycoated liners, plastic film or dry-coated papers including SUNCRYL CR 191 available from Omnova Solutions of Chester, S.C., Griff Paper & Film—Fallsington, Pa., Pacon Corp.—N. Grosvernordale, Conn., Elliott Schultz & Associates, Inc.—Cincinnati, Ohio and others. Film 103 provides protection during transportation and handling and is removed prior to installation of the laminated structure.

Finally, the assembly is subjected to dehumidification and drying to allow the panels to dry, typically for forty-eight (48) hours.

In one embodiment of this invention, the glue 102, when spread over surface 104, gypsum board 101, or any other material, is subject to a gas flow for about forty-five seconds to partially dry the glue. The gas can be heated, in which case the flow time may be reduced. The glue 102, when originally spread out over any material to which it is being applied, is liquid. By partially drying out the glue 102, either by air drying for a selected time or by providing a gas flow over the surface of the glue, the glue 102 becomes a pressure sensitive adhesive, much like the glue on a tape. Protective cover layer of film 103 is then placed over the glue 102 and pressed against gypsum board 101 for a selected time at a selected pressure. In one embodiment of this invention, the glue 102, is subject to a gas flow for about forty-five seconds to fully dry the glue and the layer of film 103 is pressed into place with a pressure between one and five pounds force per square inch. The gas flowing over the glue 102 can be, for example, air or dry nitrogen. The gas dehumidifies the glue 102, improving manufacturing throughput compared to the pressing process described previously wherein the glue 102 is not dried for an appreciable time prior to placing layer 103 in place.

Figure 1A:
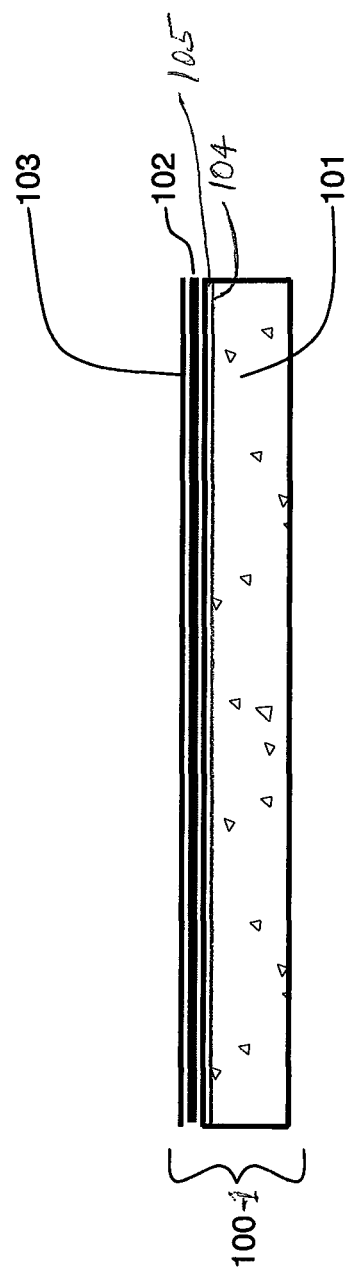
FIG. 1A shows a second embodiment of a laminated structure fabricated in accordance with the present invention.

Referring to FIG. 1A, an alternative embodiment of the present invention is disclosed. In FIG. 1A, a laminated structure 100-1 is shown. Certain of the elements in laminated structure 100-1 are common with those shown in FIG. 1, and accordingly, the same reference characters are utilized. In laminated structure 100-1, a cover layer 105, which may be made of paper or a fiberglass mat, cover surface 104 of a gypsum board layer 101. Viscoelastic glue layer 102 was placed over the cover layer 105 and followed by that release layer 103 is placed on the upper surface of viscoelastic glue layer 102. The composition is treated as set forth above with regard to laminated structure 100 as shown and described in connection with FIG. 1.

Figure 1B:
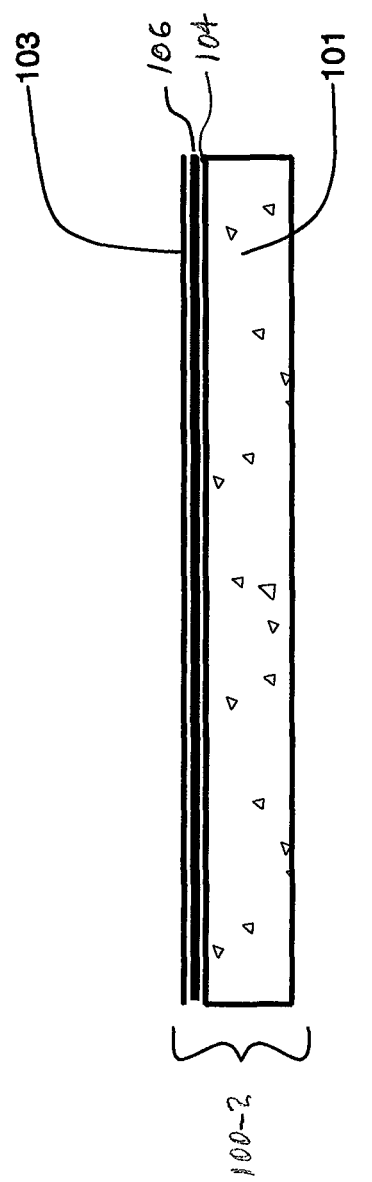
FIG. 1B shows a third embodiment of a laminated structure fabricated in accordance with the present invention.
Figure 1:
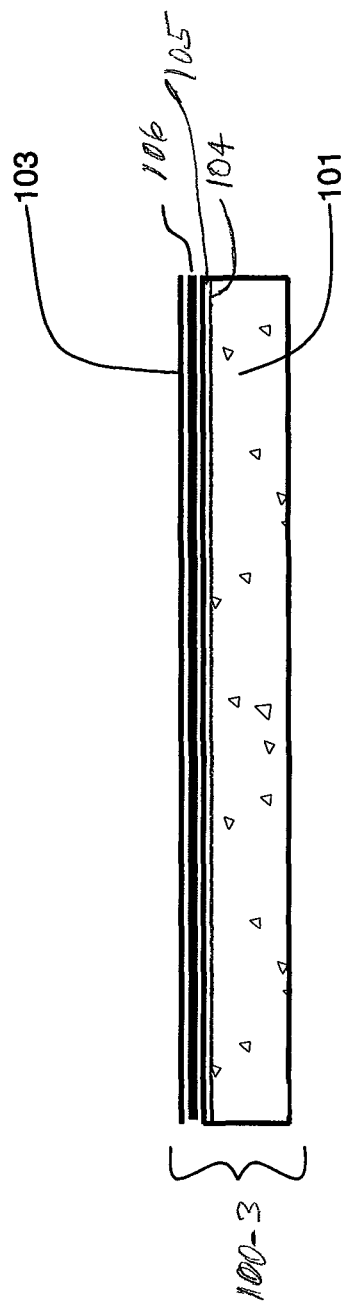

FIG. 1B illustrates a third embodiment of the present invention. In the laminated structure 100-2 in FIG. 1B, common structures from prior figures utilize common reference characters. As will be appreciated by a reference to a FIG. 1B, a fire-enhanced viscoelastic glue layer 106 constructed of the material as set forth above is placed on surface 104 of gypsum board 101. Release layer 103 is then placed over the fire-enhanced viscoelastic glue layer 106. The combination is completed in the manner set forth above.

FIG. 1C illustrates yet another embodiment of the present invention. In the laminated structure 100-3 shown in FIG. 1C, the elements common to prior figures utilize the same reference characters. In the embodiment in FIG. 1C, as in the embodiment in FIG. 1A, a cover layer 105 is placed on surface 104 of gypsum board 101. A layer 106 of fire-enhanced viscoelastic glue is then placed over cover layer 104, and finally release film 103 is added to provide protection during transportation as noted above.

Figure 1D:
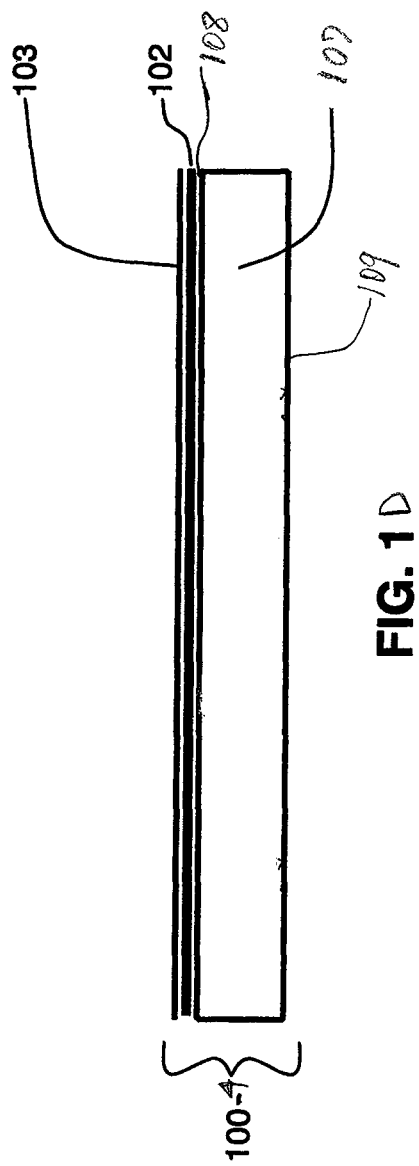
FIG. 1D shows a fifth embodiment of a laminated structure fabricated in accordance with the present invention.
Figure 1:
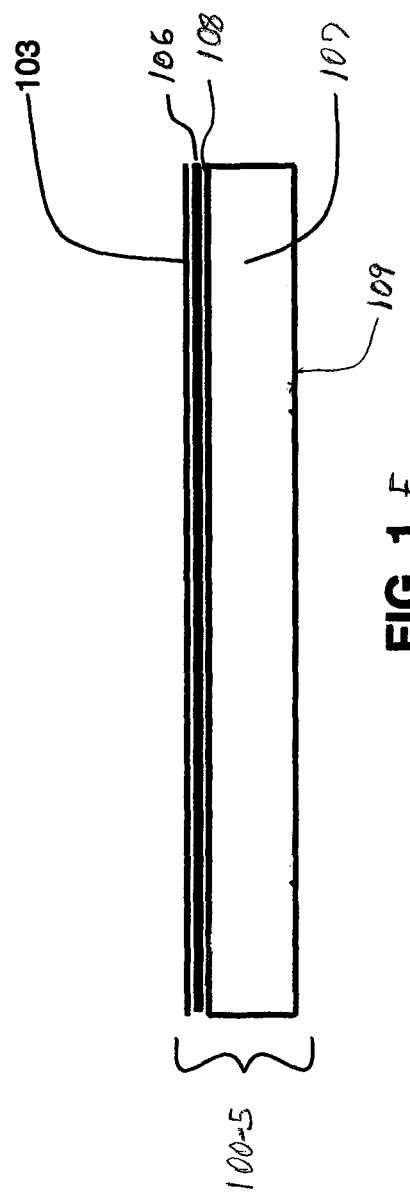

Yet another embodiment of the present invention is disclosed in FIG. 1D. Laminated structure 100-4 is shown, the structure including a layer of cement board 107, a layer of viscoelastic glue 102 which is applied to the surface 108 of a cement-based board 107. Finally, a release layer of film 103 is placed on the viscoelastic glue 102 to complete the laminated structure. As will be appreciated by reference to prior figures, commonly used reference characters from the prior figures are also utilized in this figure. The cement-based board, although heavier weight-wise, can provide an additional sound intrusion prevention over a structure in the prior embodiments which utilized a gypsum board 101. A cement-based board 107 may be implemented by a various number of structures, such as, but not limited to, calcium silicate board, magnesium oxide-based board and phosphate-based cement board. Suitable cement based boards are available from United States Gypsum of Chicago, Ill. and James Hardie Industries NV of The Netherlands. Calcium silicate based boards may be obtained from a number of manufacturers and suppliers including Ningbo Yihe Green Board Co. Ltd. of China and Zibo Xindi Refractory Co., Ltd. of China. Magnesium oxide-based board is available from Magnum Building Products of Tampa, Fla.; Technological Environmental Building Materials Co., Ltd. of China; and Evernice Building Materials Co., Ltd. of China. Phosphate based cement board is available from Serious Materials, 1250 Elko Drive, Sunnyvale, Calif. 94089, which is known as EcoRock™ board. The thickness of cement-based board 107 that measures from surface 108 to lower surface 109, for use in suitable construction, is set forth herein, would be from about X inches to Y inches.

A further embodiment of the present invention is illustrated in FIG. 1E which shows laminated structure 100-5. Comparing the embodiment of FIG. 1E to FIG. 1D, and the embodiment of FIG. 1D, in the embodiment of FIG. 1E laminated structure 100-5 utilizes fire-enhanced viscoelastic glue indicated by reference character 106. The remaining elements in this structure of FIG. 1E are commonly also found in the embodiment in FIG. 1D. As pointed out above, the cement-based board 107 may have a number of compositions including, but limited to those described above with respect to laminated structure 100-4. Laminated structure 100-5 includes additional fire intrusion protection provided by fire-enhanced viscoelastic glue 106 which is described in a number of locations above. Further as described above, the laminated structures in FIGS. 1D and 1E are equally applicable to panels for wall structure 420 and 520 illustrated in FIGS. 4 and 5 respectively.

Figure 1F:
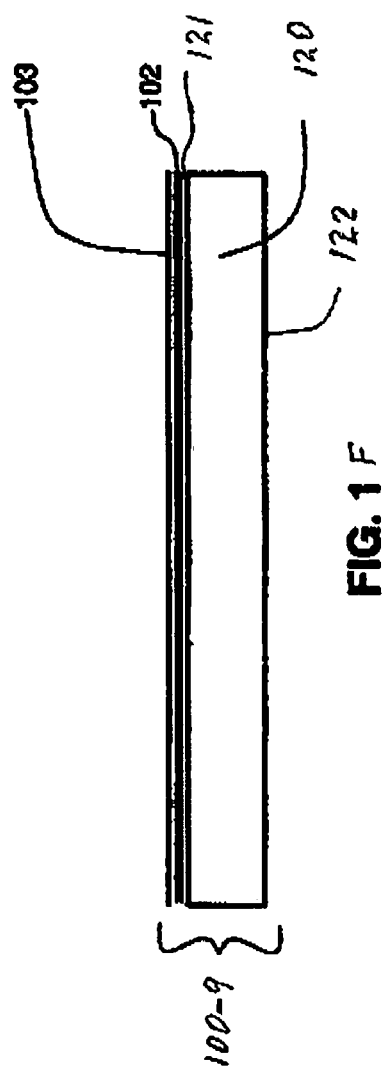
FIG. 1F shows a seventh embodiment of a laminated structure fabricated in accordance with the present invention.
Figure 1:
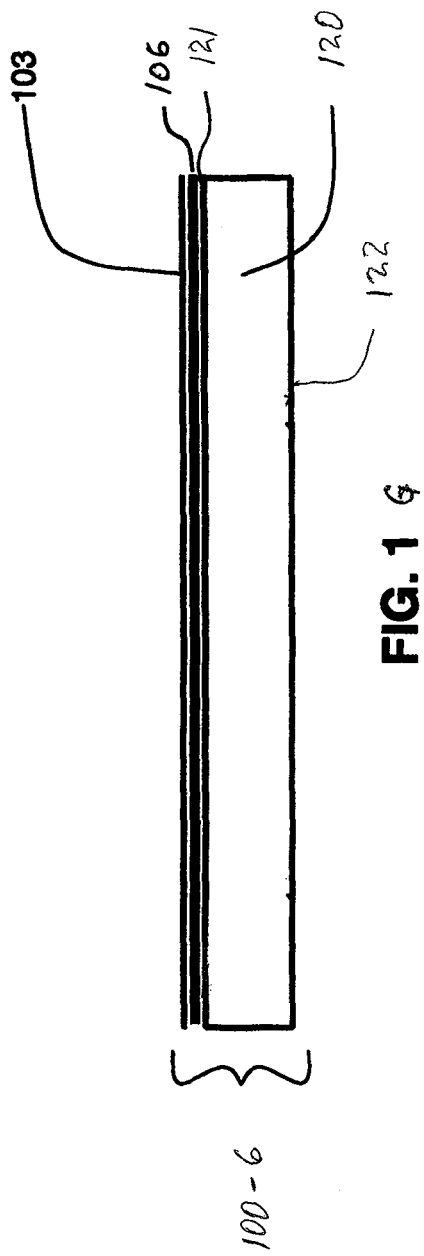
Figure 1:
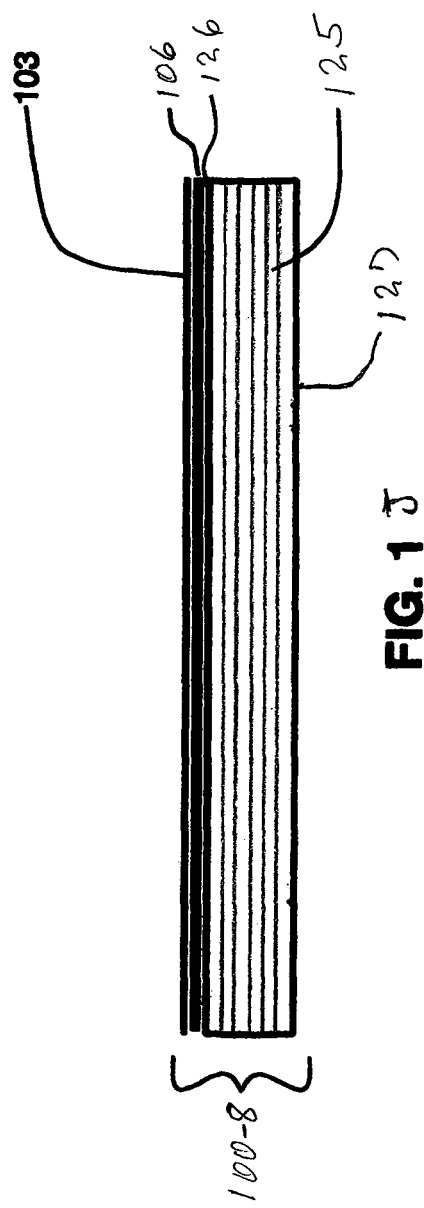

Referring to FIG. 1F, a further embodiment of the present invention is disclosed. In embodiment disclosed in FIG. 1F, a laminated structure 100-9 includes a cellulose-based board 120. A layer of viscoelastic glue 102 is placed on surface 121 and release film 103 is placed on viscoelastic glue layer 102. The structure is constructed in the same manner as that for similar structures above, that is, a glue layer 102 is placed on surface 121, followed by release film 103 and the combination is pressed together and heated as described above. A cellulose-based layer 120 may take various forms, including, but not limited to wood, medium density fiberboard (MDF), oriented strand board (OSB), or particle board. A suitable thickness of layer 120 measured from surface 121 to lower surface 122 would be about ½ inches thick. It will of course be appreciated that other forms of cellulose-based material may be utilized in addition to those described above.

FIG. 1G illustrates yet another embodiment of the present invention showing laminated structure 100-6. Common elements in the laminated structure of FIG. 1G to those in earlier figures carry the same reference character number. In the embodiment in FIG. 1G, fire resistant, viscoelastic glue layer 106 is utilized. In addition to providing improved sound attenuation, it will of course be appreciated that the fire resistant, viscoelastic glue layer 106 also is helpful in reducing fire intrusion. The materials and thicknesses for cellulose-based board 120 are as described above in connection with FIG. 1F.

Referring to FIG. 1H, a laminated structure 100-7 is illustrated and as will be noted, includes a number of common elements with previous embodiments. In laminated structure 100-7, a plywood panel indicated by reference character 125 is provided and viscoelastic glue layer 102 is placed on upper surface 126 of plywood panel 125. As in the previous embodiments, a film layer 103 is placed over viscoelastic glue layer 102 to provide protection during shipping and handling and prior to installation of the laminated structure on a wall. Plywood panel 125 may have various thicknesses such as ⅜ to ¾ inches thick. The construction of laminated structure 100-7 follows the same techniques as described above regarding previous embodiments.

Yet another embodiment of the present invention is illustrated in FIG. 1-J which shows laminated structure 100-8. Laminated structure 100-8 is similar to the embodiment shown in FIG. 1-H, with the exception that in the embodiment of FIG. 1-J fire resistant, viscoelastic glue layer 106 is utilized instead of viscoelastic glue layer 102 utilized in the embodiment of FIG. 1-H. As will of course be appreciated, the fire-resistant viscoelastic glue layer 106 provides additional fire intrusion protection while at the same time achieving the sound transmission reduction which is achieved by using a viscoelastic glue layer. The construction of laminated structure 100-8 follows the same techniques utilized above in previous embodiments and accordingly will not be repeated.

Figure 2A:
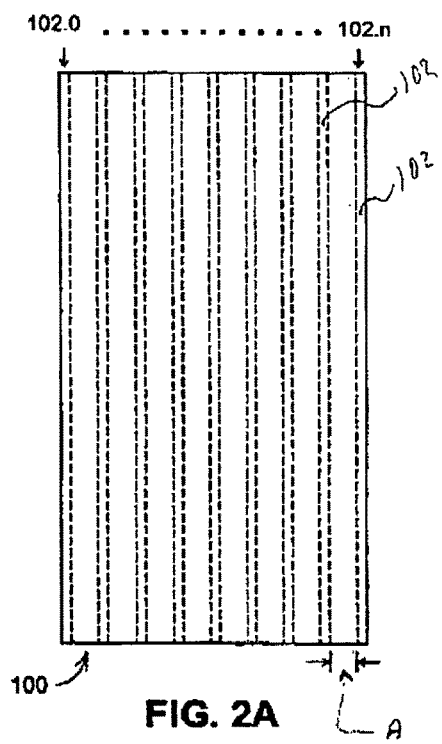
FIG. 2A is an example of optional patterns for applying stripes of glue on a laminated structure in accordance with the present invention.

FIG. 2A illustrates an example of a optional embodiment of applying glue 102 to less than 100 percent of the panel surface. FIG. 2A illustrates a pattern for applying the glue layer 102 as vertical strips on a 4'×8' gypsum sheet. The terms "vertical" and "horizontal", "top" and "bottom" apply only to the figures of FIGS. 2A, 2B, 3A and 3B as shown for the purpose of discussion. The panel 100 may be installed in any orientation. Looking to FIG. 2A, "n" vertical strips of glue 102 provide a six inch spacing between the centers of adjacent strips for less than six inch spacing between strips. For example, for a 4'×8' gypsum sheet, there are a minimum of n=9 vertical strips across the top/bottom four-foot span. A 4'×8' sheet has 4,608 sq inches of surface area. For twenty percent coverage, each strip is ((4608/96)/9)*(0.20) or about one inch wide, ninety-six inches long. For eighty percent coverage, each strip is about 4.25 inches wide, 96 inches long. In one embodiment there are more strips, spaced more closely together. For example seventeen vertical strips (that is, n=17) approximately one half inch wide on approximately three inch centers provides approximately twenty percent coverage. Other combinations of strip width and spacing may be used. The strips may be applied horizontally instead of vertically.

Figure 2B:
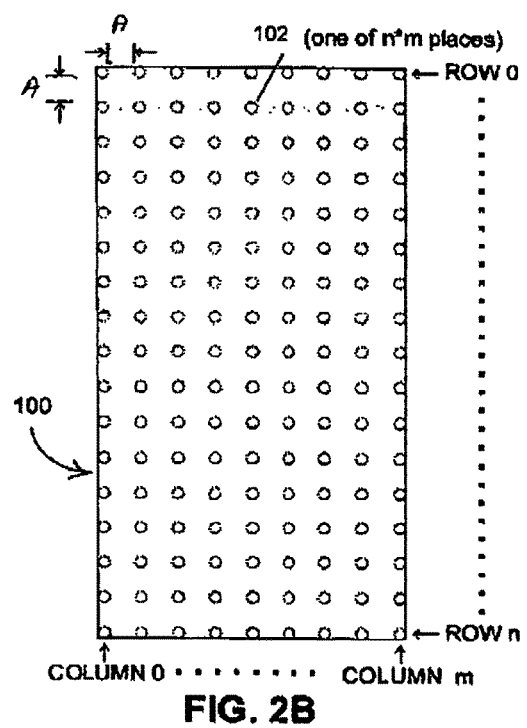
FIG. 2B is an example of a pattern for applying a matrix of patches of glue on a laminated structure in accordance with the present invention.

FIG. 2B is another example of a pattern for applying the glue 102, shown as patches on a 4'×8' panel. Each patch is spaced apart by six inches edge-to-edge. For the example shown, with a maximum spacing of six inches, nine patches are applied in the horizontal direction and seventeen in the vertical direction, providing a matrix of circles as shown. The area of each patch, described as an effective diameter of a circle is found as:

$$D = 2\sqrt{4608 \times ((\%\text{coverage})/(17 \times 9) \times \pi)}$$

Using the above formula, for twenty percent coverage each patch is approximately 2¾ inches diameter, and for eighty percent coverage each patch is approximately 5½ inches in diameter. Though the patches are referred to as circles, the shape is not important. As with strips, more circles of a smaller diameter may be used. For example, 300 circles of two inch diameter provide twenty percent coverage. In some embodiments a large number of smaller patches of glue 102 is used to insure keeping the laminate suitable for attachment to the host wall assembly when pieces are cut for installation over a small area.

Figure 3A:
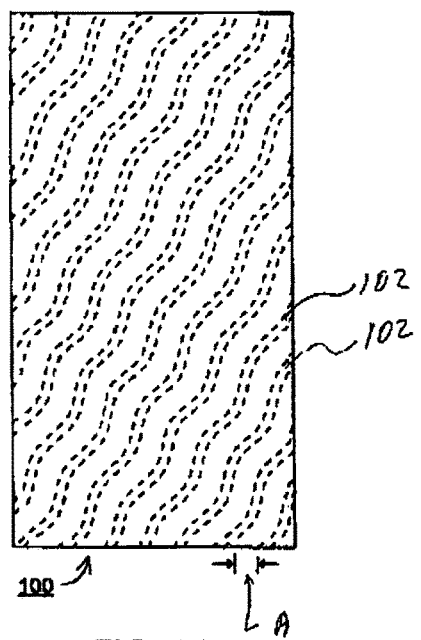
FIG. 3A is an example of a wavy pattern for applying glue on a laminated structure in accordance with the present invention.
Figure 3B:
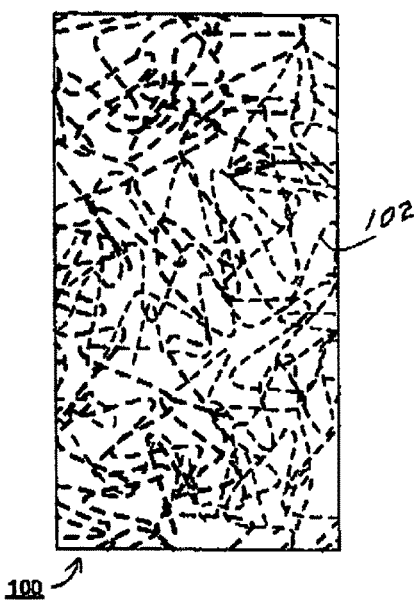
FIG. 3B is an example of a random pattern for applying glue on a laminated structure in accordance with the present invention.

A variety of patterns may be used in applying the glue 102 during construction of the laminated panel 100. A consideration in selecting a pattern is to insure that when a laminated panel 100 is cut during installation there will be some glue 102 near the panel cut edge, thus providing a bond at the cut edge to diminish the likelihood of panel 100 coming apart due to handling. For example, the pattern of FIG. 2A might be cut vertically on the right side next to the left edge of a vertical strip, resulting in a significant gap in glue 102 coverage down the cut edge (assuming the piece to the left is the portion being installed). Accordingly, some patterns are used that improve edge coverage, regardless of the location of the cutting line. One example of such a pattern is shown in FIG. 3A, wherein the glue pattern is wavy. A typical straight cut of the laminated panel 100 with a glue 102 pattern as shown in FIG. 3A would result in some glue 102 at the cut edge. As with vertical or horizontal straight strips, the wavy strips are spaced a maximum distance apart, the maximum spacing being a half wavelength of sound in the frequency of interest for the material being used for panel 101. The pattern shown is FIG. 3B is another embodiment of a glue 102 pattern wherein there is likely to be glue 102 coverage to a typical cut edge. The pattern shown in FIG. 3B may be made, for example, by a random path of a glue gun. Complete coverage of an edge by glue 102 is not required; partial glue 102 coverage of individual edges will generally hold the resulting laminated panel 100 pieces to the host wall assembly for installation. The foregoing glue application patterns are of course equally applicable to all of the laminated structures disclosed herein, as well as being applicable to fire-resistant, viscoelastic glue 106.

Figure 4:
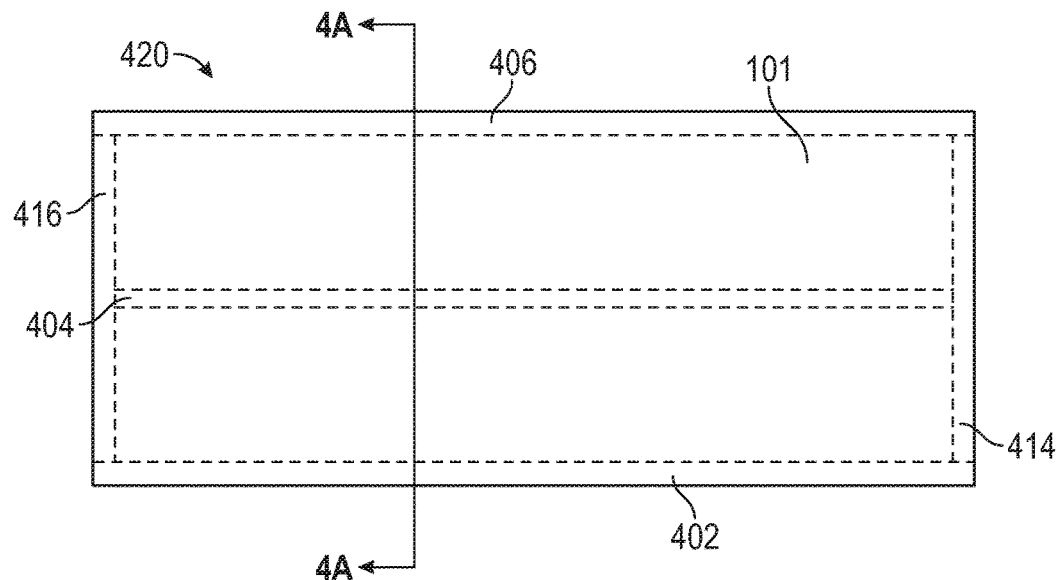
FIG. 4 is a plan view of a wall structure wherein one panel of the structure includes a laminated panel constructed in accordance with the present invention.
Figure 4A:
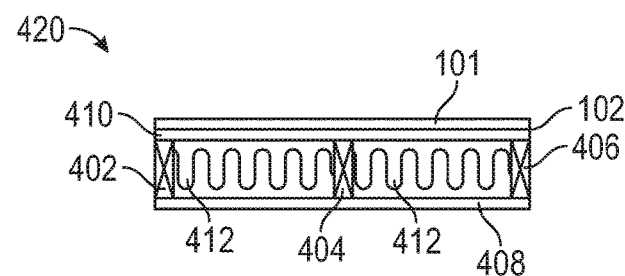
FIG. 4A is a cross-sectional view taken along line 4A-4A of FIG. 4.

FIG. 4 and the cross-sectional view shown in FIG. 4A illustrate a wall structure 420 which includes laminated panel 100 after removal of film 103, with glue layer 102 attached to a base layer 410 of existing gypsum wallboard. Wall structure 420 includes wood studs 402, 404, 406, headers and footers 416 and 414 respectively, batt-type insulation 412 and a ⅝ inch sheet of standard gypsum drywall 408.

Figure 5:
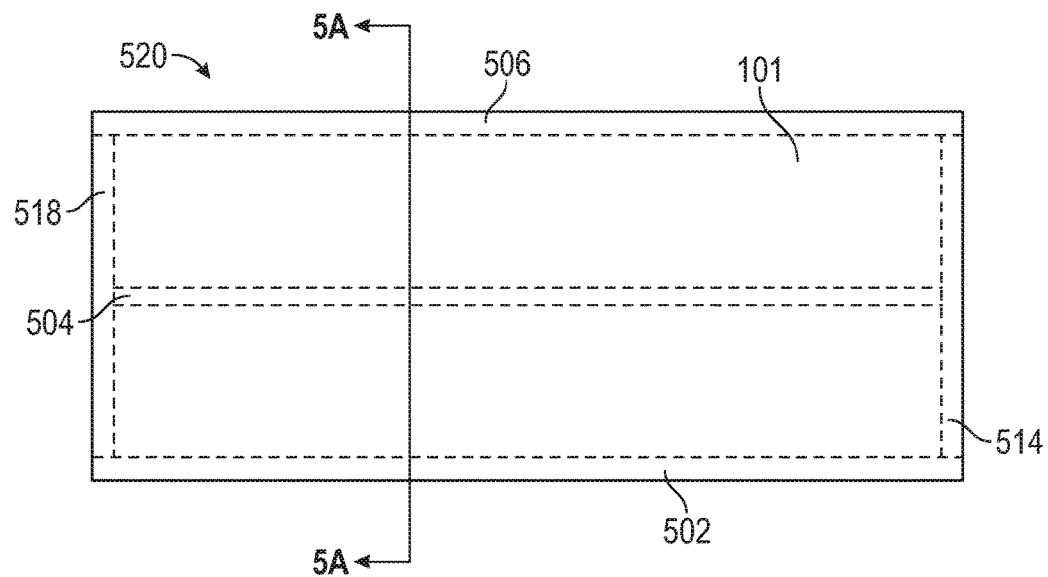
FIG. 5 is a plan view of a wall structure wherein two panels of the structure are laminated panels constructed in accordance with the present invention.
Figure 5A:
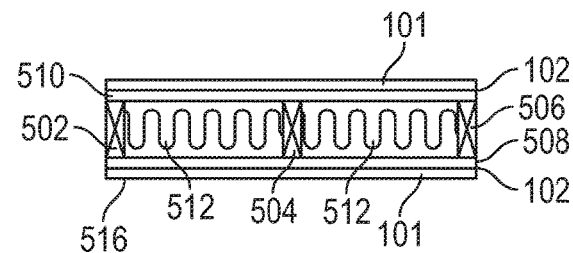
FIG. 5A is a cross-sectional view taken along line 5A-5A in FIG. 5.

FIG. 5 and cross-sectional view 5B-5B shown in FIG. 5A illustrate wall assembly 520 which is similar to wall assembly 420 shown in FIG. 4. Laminated panels of the type disclosed in FIG. 1 are attached to base layers of existing gypsum wallboard 510 and 508. Wall structure 520 includes studs 502, 504, 506, upper and lower 2×4 members 518 and 514, along with batt-type insulation 412.

Figure 6:
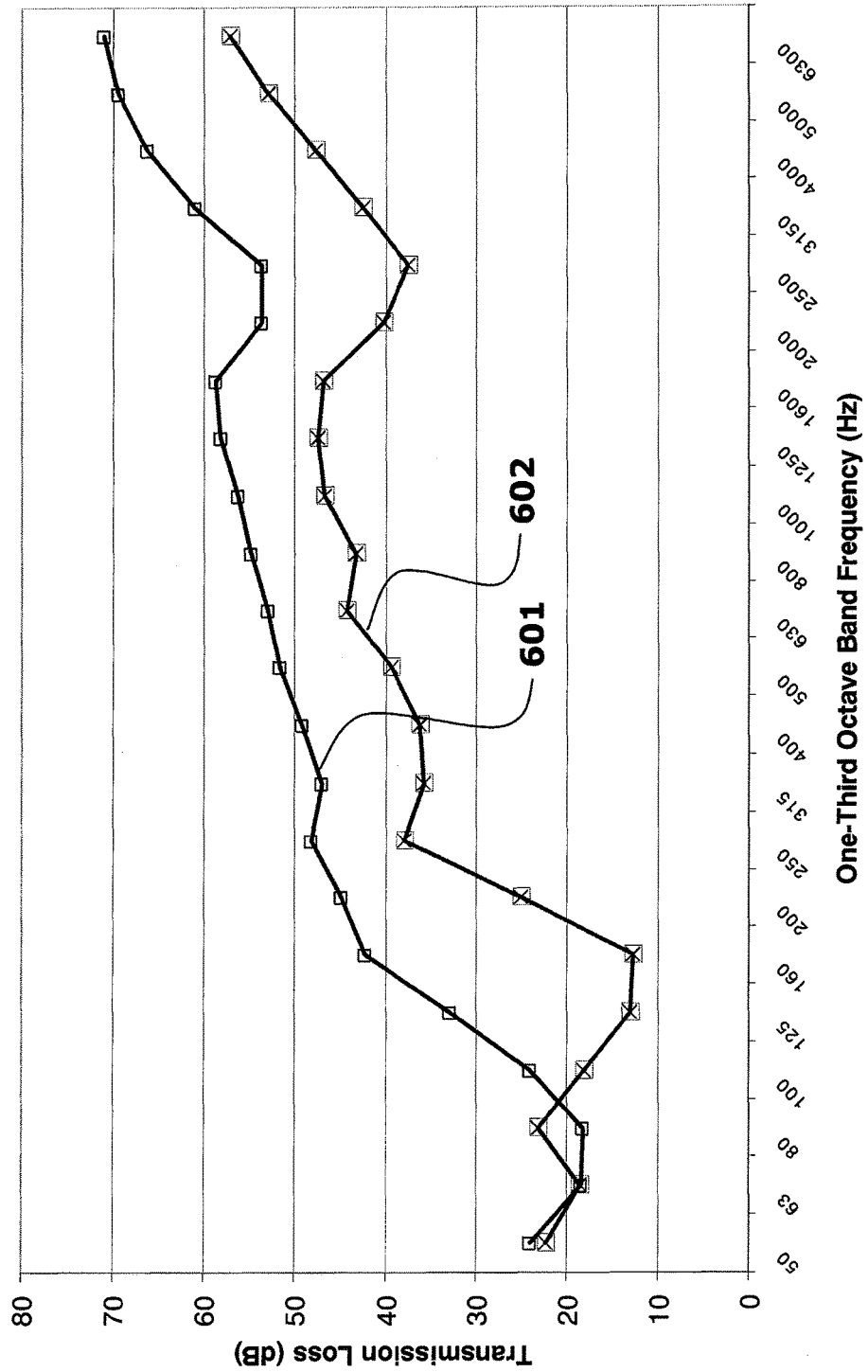
FIG. 6 is a plot of the test results of sound attenuation tests over a range of frequencies for one embodiment of this invention and that of standard construction methods.

FIG. 6 shows the results of sound testing for a structure as shown in FIG. 5, wherein the performance exhibited by curve 601 is representative of the wall assembly illustrated in FIG. 5. Sound attenuation values (STC numbers) were essentially the same for all samples yielding, an STC of approximately 49. It is known to those practicing in this field that a similar configuration with standard ⅝ inch drywall on both sides of standard 2×4 wood stud construction yields curve 602 and an STC of approximately 34. Accordingly, this invention yields a 15 STC point improvement over standard drywall in this particular construction.

In fabricating the structure of FIG. 1, the viscoelastic glue 102 is first applied in a prescribed manner with full coverage or in a selected pattern, typically to ¹⁄₁₆ inch thickness, although other thicknesses can be used if desired, onto surface 104 of gypsum board 101. Film layer 103 is then placed over the viscoelastic glue layer 102. Depending on the drying and dehumidification techniques deployed, anywhere from five minutes to forty-eight hours are required to totally dry the glue in the case that the glue is water-based. A solvent-based viscoelastic glue can be substituted.

Laminated structures according to the present invention are particularly well suited for attachment to existing lightweight wall assemblies having gypsum wallboard faces. For installation, first the release film 103 is removed from the composite panel and a composite panel is attached to one or both gypsum faces of the existing wall assembly. Initial attachment is via the adhesion of the viscoelastic glue, but installation is best completed by screwing the panel to the stud assembly through the existing gypsum wall board. Attachment of the laminated structures to the existing wall board structure can of course be accomplished by other techniques, such as to the existing wall board without attachment to the stud assembly, or with a combination of both techniques. Accordingly, the newly created laminated structure created by the bonded gypsum panels, as well as with other laminated structures described herein, provides a significant improvement in the sound transmission class number associated with the structures and thus reduces significantly the sound transmitted from one room to adjacent rooms while simultaneously providing for traditional scoring and hand fracture during installation. Additionally, when Fire Enhanced QuietGlue® adhesive is utilized in the laminated structure, fire intrusion is lessened.

The dimensions given for each material in the laminated structures of this invention can be varied as desired to control cost, overall thickness, weight, anticipated moisture and temperature control requirements, and STC results. The described embodiments and their dimensions are illustrative only and not limiting.

Other embodiments of this invention will be obvious in view of the above description.

What is claimed is:

1. A laminated, sound-attenuating structure having a plurality of edges comprising:
   a layer of gypsum board having first and second surfaces; and
   a layer of viscoelastic glue over the first surface covering an area less than an area of the layer of gypsum board, the viscoelastic glue containing about 60% of acrylate polymer by weight, and
   a release layer of a first selected material in direct contact with the layer of viscoelastic glue, wherein said laminated, sound-attenuating structure has a sound attenuation value of about 49.

2. The laminated, sound-attenuating structure according to claim 1, further comprising a first layer of selected material interposed between the first surface and the layer of viscoelastic glue.

3. The laminated, sound-attenuating structure according to claim 2, wherein the layer of selected material interposed between the first surface and the layer of viscoelastic glue is selected from the group consisting of paper and fiberglass.

4. The laminated, sound-attenuating structure according to claim 1, further comprising a second layer of a second selected material interposed between the first surface and the layer of viscoelastic glue.

5. The laminated, sound-attenuating structure according to claim 4, wherein the second layer of the second selected material is selected from the group consisting of paper and fiberglass.

6. The laminated, sound-attenuating structure according to claim 1, wherein the layer of viscoelastic glue comprises a layer of fire-resistant, viscoelastic glue.

7. The laminated, sound-attenuating structure according to claim 6 further comprising a first layer of selected material interposed between the first surface and the layer of fire-resistant, viscoelastic glue.

8. The laminated, sound-attenuating structure according to claim 7, wherein the first layer of selected material is selected from the group consisting of paper and fiberglass.

9. The laminated, sound-attenuating structure according to claim 6, further comprising a first layer of film of a first selected material over the layer of fire-resistant, viscoelastic glue.

10. The laminated, sound-attenuating structure of claim 9, further comprising a second layer of a second selected material interposed between the first surface and the layer of fire-resistant, viscoelastic glue.

11. The laminated, sound-attenuating structure according to claim 10, wherein the second layer of the second selected material is selected from the group consisting of paper and fiberglass.

12. The laminated, sound-attenuating structure according to claim 1, wherein the release layer of a first selected material comprises a layer of film selected from the group consisting of silicone-coated paper, polycoated liner, plastic film and dry-coated paper.

13. The laminated, sound-attenuating structure according to claim 9, wherein the first layer of film of a first selected material comprises a layer of film selected from the group consisting of silicone-coated paper, polycoated liner, plastic film and dry-coated paper.

14. A laminated, sound-attenuating structure having a plurality of edges which comprises:
   a layer of cement-based board having first and second surfaces; and
   a layer of viscoelastic glue over the first surface covering an area less than an area of the layer of cement-based board, the viscoelastic glue containing about 60% of acrylate polymer by weight, and
   a release layer of a first selected material in direct contact with the layer of viscoelastic glue, wherein said laminated, sound-attenuating structure has a sound attenuation value that is greater than about 34.

15. The laminated, sound-attenuating structure according to claim 14, wherein the layer of cement-based board is selected from the group consisting of calcium silicate board, magnesium oxide-based board and phosphate-based board.

16. The laminated, sound-attenuating structure according to claim 14, wherein the release layer of a selected material is selected from the group consisting of silicone-coated paper, polycoated liner, plastic film and dry-coated paper.

17. The laminated, sound-attenuating structure according to claim 15, wherein the release layer of a selected material is selected from the group consisting of silicone-coated paper, polycoated liner, plastic film and dry-coated paper.

18. The laminated, sound-attenuating structure of claim 14, wherein the layer of viscoelastic glue comprises a layer of fire-resistant, viscoelastic glue.

19. The laminated, sound-attenuating structure according to claim 18, wherein the layer of cement-based board is selected from the group consisting of calcium silicate board, magnesium oxide-based board and phosphate-based board.

20. The laminated, sound-attenuating structure according to claim 18, wherein the layer of cement-based board is selected from the group consisting of calcium silicate board, magnesium oxide-based board and phosphate-based board.

21. The laminated, sound-attenuating structure according to claim 18, wherein the release layer of a selected material is selected from the group consisting of silicone-coated paper, polycoated liner, plastic film and dry-coated paper.

22. A laminated, sound-attenuating structure having a plurality of edges which comprises:
   a layer of cellulose-based board having first and second surfaces;
   a layer of viscoelastic glue over the first surface covering an area less than an area of the layer of cellulose-based board, the viscoelastic glue containing about 60% acrylate polymer by weight; and
   a release layer of a first selected material in direct contact with the layer of viscoelastic glue, wherein said laminated, sound-attenuating structure has a sound attenuation value that is greater than about 34.

23. The laminated, sound-attenuating structure according to claim 22, wherein the layer of cellulose-based board is selected from the group consisting of plywood, medium density fiberboard, oriented strand board and particle board.

24. The laminated, sound-attenuating structure according to claim 22, wherein the release layer of a selected material is selected from the group consisting of silicone-coated paper, polycoated liner, plastic film and dry-coated paper.

25. The laminated, sound-attenuating structure according to claim 22, wherein the layer of cellulose-based board is selected from the group consisting of plywood, medium density fiberboard, oriented strand board and particle board; and wherein the layer of film of a selected material is selected from the group consisting of silicone-coated paper, polycoated liner, plastic film and dry-coated paper.

26. The laminated, sound-attenuating structure of claim 22, wherein the layer of viscoelastic glue comprises a layer of fire-resistant, viscoelastic glue.

27. The laminated, sound-attenuating structure according to claim 26, wherein the layer of cellulose-based board is selected from the group consisting of plywood, medium density fiberboard, oriented strand board and particle board.

28. The laminated, sound-attenuating structure according to claim 26, wherein the release layer of a selected material is selected from the group consisting of silicone-coated paper, polycoated liner, polyethylene film and dry-coated paper.

29. A laminated, sound-attenuating structure having a plurality of edges comprising:
   a layer of gypsum board having first and second surfaces;
   a layer of viscoelastic glue over the first surface having a thickness of 1/32 of an inch and covering an area less than an area of the layer of gypsum board, the viscoelastic glue containing about 60% acrylate polymer by weight, and
   a release layer of a first selected material in direct contact with the layer of viscoelastic glue, wherein said laminated, sound-attenuating structure has a sound attenuation value of about 49.

30. The laminated, sound-attenuating structure according to claim 29, said area of said layer of viscoelastic glue having patterns spaced from one another; and
   said spacing between said patterns having a maximum distance of half wavelength of sound frequency of interest for sound attenuation.

31. The laminated, sound-attenuating structure according to claim 30 wherein said patterns are used to improve edge coverage, regardless of the location of the cutting line for the structure.

32. The laminated, sound-attenuating structure according to claim 6, wherein said layer of fire-resistant viscoelastic glue contains intumescent compounds employing mixtures selected from the group consisting of inorganic foaming mixtures, expandable graphite mixtures, and a combination of inorganic foaming mixtures with expandable graphite mixtures.

33. The laminated, sound-attenuating structure according to claim 18, wherein said layer of fire-resistant viscoelastic glue contains intumescent compounds employing mixtures selected from the group consisting of inorganic foaming mixtures, expandable graphite mixtures, and a combination of inorganic foaming mixtures with expandable graphite mixtures.

34. The laminated, sound-attenuating structure according to claim 26, wherein said layer of fire-resistant, viscoelastic glue contains intumescent compounds employing mixtures selected from the group consisting of inorganic foaming mixtures, expandable graphite mixtures, and a combination of inorganic foaming mixtures with expandable graphite mixtures.

35. The laminated, sound-attenuating structure of claim 1, wherein the release layer of a first selected material is a continuous layer of material.

\* \* \* \* \*